United States Patent
Boussand

(10) Patent No.: US 10,450,488 B2
(45) Date of Patent: Oct. 22, 2019

(54) HEAT TRANSFER COMPOSITIONS HAVING IMPROVED MISCIBILITY WITH LUBRICATING OIL

(71) Applicant: ARKEMA FRANCE, Colombes (FR)

(72) Inventor: Béatrice Boussand, Sainte Foy les Lyon (FR)

(73) Assignee: ARKEMA FRANCE, Colombes (FR)

( * ) Notice: Subject to any disclaimer, the term of this patent is extended or adjusted under 35 U.S.C. 154(b) by 746 days.

(21) Appl. No.: 14/371,118

(22) PCT Filed: Jan. 9, 2013

(86) PCT No.: PCT/FR2013/050038
§ 371 (c)(1),
(2) Date: Jul. 8, 2014

(87) PCT Pub. No.: WO2013/110867
PCT Pub. Date: Aug. 1, 2013

(65) Prior Publication Data
US 2015/0027146 A1   Jan. 29, 2015

(30) Foreign Application Priority Data
Jan. 26, 2012  (FR) .................................... 12 50762

(51) Int. Cl.
*C09K 5/04* (2006.01)
*C10M 171/00* (2006.01)
*F25B 1/00* (2006.01)

(52) U.S. Cl.
CPC ......... *C09K 5/045* (2013.01); *C10M 171/008* (2013.01); *F25B 1/005* (2013.01);
(Continued)

(58) Field of Classification Search
CPC .... C10M 2207/2835; C10M 2207/026; C10M 2207/283; C10M 2207/023
See application file for complete search history.

(56) References Cited

U.S. PATENT DOCUMENTS

| 4,755,316 A | 7/1988 | Magid et al. |
| 4,971,712 A | 11/1990 | Gorski et al. |

(Continued)

FOREIGN PATENT DOCUMENTS

| JP | 2005-171233 A | 6/2005 |
| JP | 2010-024410 | 2/2010 |

(Continued)

OTHER PUBLICATIONS

International Search Report (PCT/ISA/210) dated May 2, 2013, by the European Patent Office as the International Searching Authority for International Application No. PCT/FR2013/050038.

(Continued)

*Primary Examiner* — John R Hardee

(74) *Attorney, Agent, or Firm* — Buchanan Ingersoll & Rooney P.C.

(57) ABSTRACT

A composition including 2,3,3,3-tetrafluoropropene and a lubricating oil including a polyalkylene glycol and a polyol ester, the polyol ester content in the lubricating oil being less than or equal to 25%. A method of lubricating a vapor compression circuit, the method including using a mixture including a polyalkylene glycol and a polyol ester as lubricating oil in the vapor compression circuit, in combination with a heat transfer fluid comprising 2,3,3,3-tetrafluoropropene, the content of polyol ester in the lubricating oil being less than or equal to 25%. Further, the use of said composition in methods for heating or cooling.

4 Claims, 1 Drawing Sheet

(52) U.S. Cl.
CPC .. *C09K 2205/102* (2013.01); *C09K 2205/126* (2013.01); *C09K 2205/24* (2013.01); *C10M 2207/2835* (2013.01); *C10M 2209/1033* (2013.01); *C10M 2209/1055* (2013.01); *C10N 2220/302* (2013.01); *C10N 2240/30* (2013.01)

(56) References Cited

U.S. PATENT DOCUMENTS

| | | | |
|---|---|---|---|
| 4,975,212 | A | 12/1990 | Thomas et al. |
| 5,008,028 | A | 4/1991 | Jolley et al. |
| 7,279,451 | B2 | 10/2007 | Singh et al. |
| 7,534,366 | B2 | 5/2009 | Singh et al. |
| 8,070,977 | B2 | 12/2011 | Rached |
| 8,075,798 | B2 | 12/2011 | Rached |
| 8,246,850 | B2 | 8/2012 | Rached |
| 8,252,198 | B2 | 8/2012 | Rached |
| 8,557,135 | B2 | 10/2013 | Rached |
| 8,808,569 | B2 | 8/2014 | Rached |
| 8,858,824 | B2 | 10/2014 | Boussand |
| 8,858,825 | B2 | 10/2014 | Guerin et al. |
| 9,011,711 | B2 | 4/2015 | Rached |
| 9,028,706 | B2 | 5/2015 | Rached et al. |
| 9,039,922 | B2 | 5/2015 | Rached |
| 9,127,191 | B2 | 9/2015 | Rached |
| 9,133,379 | B2 | 9/2015 | Rached |
| 9,267,064 | B2 | 2/2016 | Rached |
| 9,399,726 | B2 | 7/2016 | Rached |
| 9,505,968 | B2 | 11/2016 | Rached |
| 9,512,343 | B2 | 12/2016 | Rached et al. |
| 9,650,551 | B2 | 5/2017 | Collier et al. |
| 9,650,553 | B2 | 5/2017 | Deur-Bert et al. |
| 9,663,697 | B2 | 5/2017 | Rached |
| 9,676,984 | B2 | 6/2017 | Guerin et al. |
| 9,683,155 | B2 | 6/2017 | Deur-Bert et al. |
| 9,683,157 | B2 | 6/2017 | Rached |
| 9,884,984 | B2 | 2/2018 | Rached |
| 10,023,780 | B2 | 7/2018 | Guerin et al. |
| 10,035,938 | B2 | 7/2018 | Rached |
| 2003/0032563 | A1 | 2/2003 | Tazaki |
| 2004/0089839 | A1* | 5/2004 | Thomas et al. ............ 252/67 |
| 2004/0119047 | A1 | 6/2004 | Singh et al. |
| 2005/0145823 | A1 | 7/2005 | Yamada et al. |
| 2006/0243944 | A1 | 11/2006 | Minor et al. |
| 2006/0243945 | A1 | 11/2006 | Minor et al. |
| 2007/0004605 | A1 | 1/2007 | Matsumura et al. |
| 2009/0241562 | A1* | 10/2009 | Thomas et al. ............ 62/84 |
| 2010/0047189 | A1 | 2/2010 | Seeton et al. |
| 2010/0175421 | A1 | 7/2010 | Kaneko et al. |
| 2010/0282999 | A1 | 11/2010 | Shimomura et al. |
| 2011/0084228 | A1 | 4/2011 | Rached |
| 2011/0095224 | A1 | 4/2011 | Rached |
| 2011/0120175 | A1 | 5/2011 | Kamishima et al. |
| 2011/0186772 | A1 | 8/2011 | Rached |
| 2011/0219791 | A1 | 9/2011 | Rached |
| 2011/0219792 | A1 | 9/2011 | Rached |
| 2011/0240254 | A1 | 10/2011 | Rached |
| 2011/0284181 | A1 | 11/2011 | Rached |
| 2012/0049104 | A1 | 3/2012 | Rached |
| 2012/0056123 | A1 | 3/2012 | Rached |
| 2012/0068105 | A1 | 3/2012 | Rached et al. |
| 2012/0144857 | A1 | 6/2012 | Rached |
| 2012/0151958 | A1 | 6/2012 | Rached |
| 2012/0151959 | A1 | 6/2012 | Rached |
| 2012/0153213 | A1 | 6/2012 | Rached |
| 2012/0159982 | A1 | 6/2012 | Rached |
| 2012/0161064 | A1 | 6/2012 | Rached |
| 2012/0167615 | A1 | 7/2012 | Rached |
| 2012/0205574 | A1 | 8/2012 | Rached et al. |
| 2012/0272668 | A1* | 11/2012 | Van Horn et al. ............ 62/77 |
| 2012/0298909 | A1 | 11/2012 | Low |
| 2013/0092869 | A1 | 4/2013 | Boussand |
| 2013/0105724 | A1 | 5/2013 | Boussand |
| 2013/0186114 | A1 | 7/2013 | Guerin et al. |
| 2014/0008565 | A1 | 1/2014 | Rached et al. |
| 2014/0075969 | A1 | 3/2014 | Guerin et al. |
| 2014/0318160 | A1 | 10/2014 | Rached |
| 2014/0326017 | A1 | 11/2014 | Rached |
| 2015/0152306 | A1 | 6/2015 | Rached |
| 2015/0152307 | A1 | 6/2015 | Rached |
| 2016/0009555 | A1 | 1/2016 | Bonnet et al. |
| 2016/0024363 | A1 | 1/2016 | Rached |
| 2016/0025394 | A1 | 1/2016 | Rached |
| 2016/0194541 | A1 | 7/2016 | Guerin et al. |
| 2016/0298014 | A1 | 10/2016 | Rached |
| 2016/0355718 | A1 | 12/2016 | Rached |
| 2016/0376484 | A1 | 12/2016 | Guerin et al. |
| 2017/0145276 | A1 | 5/2017 | Rached |
| 2018/0148395 | A1 | 5/2018 | Rached et al. |

FOREIGN PATENT DOCUMENTS

| | | |
|---|---|---|
| JP | 2011-246587 | 12/2011 |
| WO | WO 01/48127 A1 | 7/2001 |
| WO | WO 2004/037913 A2 | 5/2004 |
| WO | WO 2005/042663 A1 | 5/2005 |
| WO | WO 2005/103187 A1 | 11/2005 |
| WO | WO 2006/094303 A2 | 9/2006 |
| WO | WO 2008/153106 A1 | 12/2008 |
| WO | WO 2009/057475 A1 | 5/2009 |
| WO | WO 2010/010917 A1 | 1/2010 |
| WO | WO 2010/022018 A2 | 2/2010 |
| WO | WO 2011/023923 A1 | 3/2011 |

OTHER PUBLICATIONS

Christian Puhl, "Refrigeration Oils for Future Mobile A/C Systems", Fuchs Europe Schmierstoffe, 2009, retrieved from the internet: http://www.r744.com/assets/link/FUCHS_Puhl_VDA%20Winter%20Meeting%202009.pdf, 18 pages.

U.S. Appl. No. 13/122,606, Wissam Rached, filed Apr. 5, 2011, (Cited herein as US Patent Application Publication No. 2011/0186772 A1 of Aug. 4, 2011).

U.S. Appl. No. 13/391,400, Wissam Rached, filed Feb. 29, 2012, (Cited herein as US Patent Application Publication No. 2012/0151959 A1 of Jun. 21, 2012).

U.S. Appl. No. 13/393,626, Wissam Rached, filed Mar. 1, 2012, (Cited herein as US Patent Application Publication No. 2012/0167615 A1 of Jul. 5, 2012).

U.S. Appl. No. 13/390,379, Wissam Rached, filed Feb. 14, 2012, (Cited herein as US Patent Application Publication No. 2012/0153213 A1 of Jun. 21, 2012).

U.S. Appl. No. 14/329,556, Wissam Rached, filed Jul. 11, 2014, (Cited herein as US Patent Application Publication No. 2014/0318160 A1 of Oct. 30, 2014).

U.S. Appl. No. 14/335,281, Wissam Rached, filed Jul. 18, 2014, (Cited herein as US Patent Application Publication No. 2014/0326017 A1 of Nov. 6, 2014).

U.S. Appl. No. 13/128,996, Wissam Rached, filed May 12, 2011, (Cited herein as US Patent Application Publication No. 2011/0219791 A1 of Sep. 15, 2011).

U.S. Appl. No. 13/129,240, Wissam Rached, filed May 13, 2011, (Cited herein as US Patent Application Publication No. 2011/0219792 A1 of Sep. 15, 2011).

U.S. Appl. No. 14/114,542, Sophie Guerin, Laurent Abbas and Wissam Rached, filed Nov 4, 2013, (Cited herein as US Patent Application Publication No. 2014/0075969 A1 of Mar. 20, 2014).

U.S. Appl. No. 13/146,721, Wissam Rached, filed Jul. 28, 2011, (Cited herein as US Patent Application Publication No. 2011/0284181 A1 of Nov. 24, 2011).

U.S. Appl. No. 13/232,165, Wissam Rached and Béatrice Boussand, filed Sep. 14, 2011, (Cited herein as US Patent Application Publication No. 2012/0068105 A1 of Mar. 22, 2012).

U.S. Appl. No. 13/127,144, Wissam Rached, filed Jun. 3, 2011, (Cited herein as US Patent Application Publication No. 2011/0240254 A1 of Oct. 6, 2011).

U.S. Appl. No. 13/808,326, Béatrice oussand, filed Jan. 4, 2013, (Cited herein as US Patent Application Publication No. 2013/0105724 A1 of May 2, 2013).

(56) References Cited

OTHER PUBLICATIONS

U.S. Appl. No. 14/615,741, Wissam Rached, filed Feb. 6, 2015, (Cited herein as US Patent Application Publication No. 2015/0152306 A1 of Jun. 4, 2015).
U.S. Appl. No. 14/615,780, Wissam Rached, filed Feb 6, 2015, (Cited herein as US Patent Application Publication No. 2015/0152307 A1 of Jun. 4, 2015).
U.S. Appl. No. 14/651,855, Bertrand Collier, Dominique Duer-Bert and Laurent Wendlinger, filed Jun. 12, 2015.
U.S. Appl. No. 14/651,925, Dominique Duer-Bert and Laurent Wendlinger, filed Jun. 12, 2015.
U.S. Appl. No. 14/651,855, Collier, et al.
U.S. Appl. No. 14/651,925, Deur-bert, et al.
Collier, Bertrand, et al., U.S. Appl. No. 14/651,855 entitled "Composition Including 2,3,3,3-Tetrafluoropropene," filed in the U.S. Patent and Trademark Office on Jun. 12, 2015.
Deur-Bert, Dominique, et al., U.S. Appl. No. 14/651,925 entitled "Composition Containing 2,3,3,3-Tetrafluoropropene and 1,2-Difluoroethylene," filed in the U.S. Patent and Trademark Office on Jun. 12, 2015.
U.S. Appl. No. 14/655,500, Deur-Bert, et al.
U.S. Appl. No. 14/823,430, Rached.
U.S. Appl. No. 14/830,130, Rached.
U.S. Appl. No. 14/772,950, Bonnet, et al.
U.S. Appl. No. 14/873,855, Rached.
U.S. Appl. No. 14/873,891, Rached.
Deur-Bert, Dominique, et al., U.S. Appl. No. 14/655,500 entitled "Azeotropic or Quasi-Azeotropic Composition of Chloromethane," filed in the U.S. Patent and Trademark Office on Jun. 25, 2015.
Rached, Wissam, U.S. Appl. No. 14/823,430 entitled "Use of Ternary Compositions," filed in the U.S. Patent and Trademark Office on Aug. 11, 2015.
Rached, Wissam, U.S. Appl. No. 14/830,130 entitled "Binary Refrigerating Fluid," filed in the U.S. Patent and Trademark Office on Aug. 19, 2015.
Bonnet, Phillippe, et al., U.S. Appl. No. 14/772,950 entitled "Composition Comprising HF and 2,3,3,3-Tetrafluoropropene," filed in the U.S. Patent and Trademark Office on Sep. 4, 2015.
Rached, Wissam, U.S. Appl. No. 14/873,855 entitled "Heat Transfer Fluid," filed in the U.S. Patent and Trademark Office on Oct. 2, 2015.
Rached, Wissam, U.S. Appl. No. 14/873,891 entitled "Ternary Compositions for Low-Capacity Refrigeration," filed in the U.S. Patent and Trademark Office on Oct. 2, 2015.
U.S. Appl. No. 15/189,936, Rached.
U.S. Appl. No. 15/238,883, Rached.
Rached, Wissam, U.S. Appl. No. 15/189,936 entitled "Use of Ternary Compositions," filed in the U.S. Patent and Trademark Office on Jun. 22, 2016.
Rached, Wissam, U.S. Appl. No. 15/238,883 entitled "Heat Transfer Fluid Replacing R-134a," filed in the U.S. Patent and Trademark Office on Aug. 17, 2016.
U.S. Appl. No. 15/297,569, Rached et al.
U.S. Appl. No. 15/368,347, Rached.
U.S. Appl. No. 15/396,855, Rached.
Rached, Wissam, et al., U.S. Appl. No. 15/297,569 entitled "Composition Based on 2,3,3,3-Tetrafluoropropene," filed in the U.S. Patent and Trademark Office on Oct. 19, 2016.
Rached, Wissam, et al., U.S. Appl. No. 15/368,347 entitled "Vehicle Heating and/or Air Conditioning Method", filed in the U.S. Patent and Trademark Office on Dec. 2, 2016.
Rached, Wissam, U.S. Appl. No. 15/396,855 entitled "Heat Transfer Fluid," filed in the U.S. Patent and Trademark Office on Jan. 3, 2017.
U.S. Appl. No. 15/809,164, Rached.
U.S. Appl. No. 15/820,996, Rached.
U.S. Appl. No. 15/856,703, Rached.
U.S. Appl. No. 15/878,794, Rached et al.
Rached, Wissam, U.S. Appl. No. 15/809,164 entitled "Vehicle Heating and/or Air Conditioning Method," filed in the U.S. Patent and Trademark Office on Nov. 10, 2017.
Rached, Wissam, U.S. Appl. No. 15/820,998 entitled "Method for Heating and/or Air Conditioning a Vehicle," filed in the U.S. Patent and Trademark Office on Nov. 22, 2017.
Rached, Wissam, U.S. Appl. No. 15/856,703 entitled "Binary Refrigerating Fluid," filed in the U.S. Patent and Trademark Office on Dec. 28, 2017.
Rached, Wissam, et al., U.S. Appl. No. 15/878,794 entitled "Stabilization of 1-Chloro-3,3,3-Trifluoropropene," filed in the U.S. Patent and Trademark Office on Jan. 24, 2018.
U.S. Appl. No. 15/481,815, Collier et al.
U.S. Appl. No. 15/481,873, Duer-Bert et al.
U.S. Appl. No. 15/490,541, Duer-Bert et al.
U.S. Appl. No. 15/491,717, Rached.
Collier, Bertrand, et al., U.S. Appl. No. 15/481,815 entitled "Composition including 2,3,3,3-Tetraflouropropene," filed in the U.S. Patent and Trademark Office on Apr. 7, 2017.
Deur-Bert, Dominque, et al. , U.S. Appl. No. 15/481,873 entitled "Azeotropic or Quasi-Azeotropic Composition of Chloromethane," filed in the U.S. Patent and Trademark Office on Apr. 7, 2017.
Deur-Bert, Dominique, et al., U.S. Appl. No. 15/490,541 entitled "Composition Containing 2,3,3,3-Tetrafluoropropene and 1,2-Difluoroethylene," filed in the U.S. Patent and Trademark Office on Apr. 18, 2017.
Rached, Wissam, U.S. Appl. No. 15/491,717 entitled "Heat Transfer Method," filed in the U.S. Patent and Trademark Office on Apr. 19, 2017.
U.S. Appl. No. 15/997,077, Guerin, et al.
U.S. Appl. No. 16/034,539, Boussand.
Guerin, Sophie, et al., U.S. Appl. No. 15/997,077 entitled "2,3,3,3-Tetrafluoropropene Compositions Having Improved Miscibility," filed in the U.S. Patent and Trademark Office on Jun. 4, 2018.
Boussand, Beatrice, U.S. Appl. No. 16/034,539 entitled "Stable 2,3,3,3-Tetrafluoropropene Composition," filed in the U.S. Patent and Trademark Office on Jul. 13, 2018.
U.S. Appl. No. 14/903,461, Guerin et al.
U.S. Appl. No. 14/990,159, Boussand, et al.
U.S. Appl. No. 14/992,387, Rached.
U.S. Appl. No. 15/070,955, Guerin et al.
U.S. Appl. No. 15/073,108, Rached et al.
Guérin, Sophie, et al., U.S. Appl. No. 14/903,461 entitled, "2,3,3,3-Tetrafluoropropene Compositions Having Improved Miscibility," filed in the U.S. Patent and Trademark Office on Jan. 7, 2016.
Boussand, Beatrice, et al., U.S. Appl. No. 14/990,159, entitled "Stable 2,3,3,3-Tetrafluoropropene Composition," filed in the U.S. Patent and Trademark office on Jan. 7, 2016.
Rached, Wissam, U.S. Appl. No. 14/992,387 entitled, "Ternary Compositions for High-Capacity Refrigeration," filed in the U.S. Patent and Trademark Office on Jan. 11, 2016.
Guerin, Sophie, et al., U.S. Appl. No. 15/070,955, entitled "Heat-Transfer Compositions Exhibiting Improved Miscibility with the Lubricating Oil," filed in the U.S. Patent and Trademark Office Mar. 15, 2016.
Rached, Wissam, et al., U.S. Appl. No. 15/073,108 entitled "Stabilization of 1-Chloro-3,3,3-Trifluoropropene," filed in the U.S. Patent and Trademark Office on Mar. 17, 2016.
U.S. Appl. No. 14/903,461, Sophie Guerin and Wissam Rached, dated Jan. 7, 2016.
U.S. Appl. No. 14/990,159, Beatrice Boussand, dated Jan. 7, 2016.
U.S. Appl. No. 14/992,387, Wissam Rached, dated Jan. 11, 2016.
U.S. Appl. No. 15/070,955 Sophie Guerin, Laurent Abbas and Wissam Rached, dated Mar. 15, 2016.
U.S. Appl. No. 15/073,108 Wissam Rached, Sophie Guerin and Pascale Kindler, dated Mar. 17, 2016.

* cited by examiner

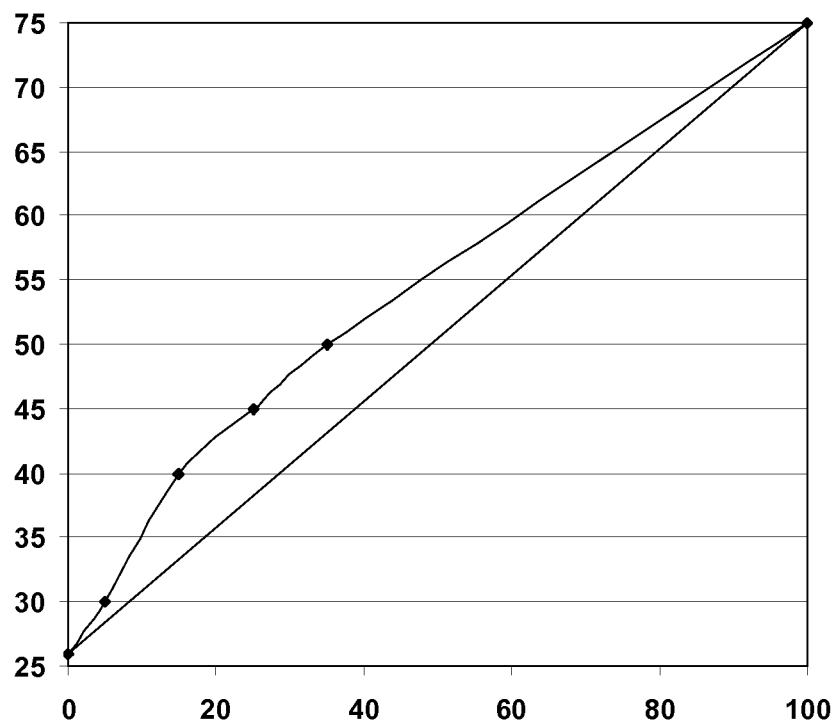

HEAT TRANSFER COMPOSITIONS HAVING IMPROVED MISCIBILITY WITH LUBRICATING OIL

TECHNICAL FIELD

Embodiments of the disclosure relate to heat transfer compositions based on 2,3,3,3-tetrafluoropropene having improved miscibility with lubricating oil.

TECHNICAL BACKGROUND

Fluids based on fluorocarbon compounds are widely used in systems for heat transfer by vapor compression, notably devices for air conditioning, heat pumps, refrigeration or freezing. These devices have in common that they are based on a thermodynamic cycle comprising vaporization of the fluid at low pressure (in which the fluid absorbs heat); compression of the vaporized fluid to a high pressure; condensation of the vaporized fluid to liquid at high pressure (in which the fluid gives up heat); and expansion of the fluid, ending the cycle.

The choice of a heat transfer fluid (which may be a pure compound or a mixture of compounds) is dictated on the one hand by the thermodynamic properties of the fluid, and on the other hand by additional constraints. Thus, a particularly important criterion is the effect of the fluid in question on the environment. In particular, chlorinated compounds (chlorofluorocarbons and hydrochlorofluorocarbons) have the disadvantage of damaging the ozone layer. Henceforth, non-chlorinated compounds such as hydrofluorocarbons, fluoroethers and fluoroolefins are therefore generally preferred.

Another environmental constraint is the global warming potential (GWP). It is therefore essential to develop heat transfer compositions having a GWP as low as possible and having good energy performance.

Moreover, to lubricate the moving parts of the compressor (or compressors) of a vapor compression system, a lubricating oil must be added to the heat transfer fluid. The oil may generally be mineral or synthetic.

The lubricating oil is selected based on the type of compressor, and such that it does not react with the heat transfer fluid proper and with the other compounds present in the system.

For certain heat transfer systems (notably of small size), the lubricating oil is generally allowed to circulate in the whole circuit, the pipework being designed in such a way that the oil can flow by gravity to the compressor. In other heat transfer systems (notably of large size), an oil separator is provided immediately after the compressor as well as an oil level management device, ensuring return of the oil to the compressor or compressors. Even when an oil separator is present, the system pipework must also be designed so that the oil can return by gravity to the oil separator or to the compressor.

U.S. Pat. Nos. 7,279,451 and 7,534,366 describe compositions based on fluoroolefins, for example based on tetrafluoropropene. Various lubricating oils are also envisaged. Moreover, the document reports the results for compatibility between 1,2,3,3,3-pentafluoropropene (HFO-1225ye), 1,3,3,3-tetrafluoropropene (HFO-1234ze) or 3,3,3-trifluoropropene (HFO-1243zf) and lubricating oils of the polyalkylene glycol type.

When the heat transfer compound or compounds have poor miscibility with the lubricating oil, the latter has a tendency to be trapped at the level of the evaporator and not return to the compressor, which does not allow the system to function correctly.

In this respect, there is still a need to develop heat transfer compositions with low GWP (and displaying good energy performance), in which the heat transfer compounds have good miscibility with the lubricating oil.

In particular, 2,3,3,3-tetrafluoropropene (HFO-1234yf) is a heat transfer compound that is particularly interesting notably owing to its low GWP and its good energy performance. However, its miscibility with certain lubricating oils is imperfect and limits its application. It is therefore desirable to improve the miscibility of compositions based on HFO-1234yf with the usual lubricating oils.

SUMMARY

The disclosure relates firstly to a composition comprising 2,3,3,3-tetrafluoropropene and a lubricating oil comprising a polyalkylene glycol and a polyol ester, the content of polyol ester in the lubricating oil being less than or equal to 25%.

According to one embodiment, the content of polyol ester in the lubricating oil is from 5 to 25%, preferably from 7 to 20%, more especially preferably from 10 to 15%.

According to one embodiment, the composition comprises from 1 to 99% of lubricating oil, preferably from 5 to 50%, more especially preferably from 10 to 40%, and ideally from 15 to 35%.

According to one embodiment, the composition further comprises: one or more additives selected from heat transfer compounds, stabilizers, surfactants, tracing agents, fluorescent agents, odoriferous agents, solubilizers and mixtures thereof; preferably one or more additives selected from stabilizers, surfactants, tracing agents, fluorescent agents, odoriferous agents, solubilizers and mixtures thereof.

According to one embodiment, 2,3,3,3-tetrafluoropropene is the only heat transfer compound present.

The disclosure also relates to the use of a mixture comprising a polyalkylene glycol and a polyol ester as lubricating oil in a vapor compression circuit, in combination with a heat transfer fluid comprising 2,3,3,3-tetrafluoropropene, the content of polyol ester in the lubricating oil being less than or equal to 25%.

According to one embodiment, the heat transfer fluid consists essentially, or preferably consists, of 2,3,3,3-tetrafluoropropene.

According to one embodiment, the content of polyol ester in the lubricating oil is from 5 to 25%, preferably from 7 to 20%, more especially preferably from 10 to 15%.

The disclosure also relates to a heat transfer installation comprising a vapor compression circuit containing a heat transfer composition which is a composition as described above.

According to one embodiment, the installation is selected from mobile or stationary installations for heating by heat pump, air conditioning, refrigeration, freezing and Rankine cycles.

According to one embodiment, the installation is an automotive air conditioning installation.

The disclosure also relates to a method for heating or cooling a fluid or a body by means of a vapor compression circuit containing a heat transfer fluid, said method comprising successively the at least partial evaporation of the heat transfer fluid, compression of the heat transfer fluid, at least partial condensation of the heat transfer fluid and expansion of the heat transfer fluid, in which the heat transfer fluid is combined with a lubricating oil to form a heat transfer composition, said heat transfer composition being a composition as described above.

According to one embodiment, the method is a method of mobile or stationary air conditioning, and preferably a method of automotive air conditioning.

The disclosure also relates to a method of reducing the environmental impact of a heat transfer installation comprising a vapor compression circuit containing an initial heat transfer fluid, said method comprising a step of replacing the initial heat transfer fluid in the vapor compression circuit with a final heat transfer fluid, the final heat transfer fluid having a lower GWP than the initial heat transfer fluid, in which the final heat transfer fluid is combined with a lubricating oil to form a heat transfer composition, said heat transfer composition being a composition as described above.

The disclosure also relates to the use of a polyol ester for increasing the miscibility of 2,3,3,3-tetrafluoropropene with a polyalkylene glycol.

According to one embodiment, the polyol ester is used at a rate from 5 to 25%, preferably from 7 to 20%, more especially preferably from 10 to 15%, relative to the total amount of polyol ester and of polyalkylene glycol.

The disclosure also relates to a kit comprising:
a heat transfer fluid comprising 2,3,3,3-tetrafluoropropene on the one hand;
a lubricating oil comprising a polyalkylene glycol and a polyol ester on the other hand, the content of polyol ester in the lubricating oil being less than or equal to 25%;
for use in a heat transfer installation comprising a vapor compression circuit.

According to one embodiment, the content of polyol ester in the lubricating oil is from 5 to 25%, preferably from 7 to 20%, more especially preferably from 10 to 15%.

According to one embodiment, the heat transfer fluid consists essentially, preferably consists, of 2,3,3,3-tetrafluoropropene.

According to one embodiment, the kit is for use in an automotive air conditioning installation.

Embodiments of the disclosure it possible to meet the needs felt in the known art. More particularly, it supplies heat transfer compositions with low GWP, displaying good energy performance, and in which the heat transfer compounds have good miscibility with the lubricating oil.

In particular, the disclosure supplies heat transfer compositions based on HFO-1234yf, having improved miscibility with lubricating oils based on polyalkylene glycols.

This is achieved by adding a polyol ester to the lubricating oil. In fact, the present inventors found that the presence of the polyol ester improves the properties of miscibility of HFO-1234yf with the polyalkylene glycols, beyond what might be expected by simply extrapolating the properties of miscibility of HFO-1234yf with the polyalkylene glycol on the one hand and with the polyol ester on the other hand. There is therefore a synergistic effect between the polyalkylene glycol and the polyol ester from the standpoint of miscibility with HFO-1234yf.

Oils of the polyalkylene glycol type have good lubricating power, a low flow point, good fluidity at low temperature, and good compatibility with the elastomers generally present in a vapor compression circuit. Furthermore, they are relatively less expensive than other lubricating oils and they are oils that are now used extensively in certain fields, and notably in the field of automotive air conditioning. It is therefore very advantageous to improve the miscibility of HFO-1234yf with a lubricating oil of the polyalkylene glycol type, so as to be able to use this heat transfer compound to a greater extent in combination with this lubricating compound.

From another aspect, the polyol esters are compounds that are generally less stable with respect to hydrolysis than the polyalkylene glycols. It is therefore desirable to limit the amount of polyol ester in the lubricating oil in order to avoid excessive degradation of the oil, in particular in the applications where there is a relatively high risk of ingress of moisture into the vapor compression circuit (which is the case notably for automotive air conditioning). In these circumstances, it was found that a content of polyol ester in the lubricating oil of less than or equal to 25% constitutes the best compromise between the synergistic improvement in miscibility with HFO-1234yf and the stability of the composition.

BRIEF DESCRIPTION OF THE DRAWINGS

FIG. 1 shows a curve representing the maximum temperature of miscibility of a mixture of 75% of HFO-1234yf and 25% of lubricating oil composed of polyalkylene glycol and polyol ester (on the ordinate, in ° C.), as a function of the proportion by weight of polyol ester in the lubricating oil (on the abscissa, in %). The straight line plotted on the diagram represents the result that would be expected if the miscibility of HFO-1234yf with the polyalkylene glycol and the polyol ester showed purely additive behavior.

DESCRIPTION OF EMBODIMENTS

Embodiments of the disclosure are now described in more detail and nonexhaustively in the description given below.

Unless stated otherwise, throughout the application the proportions of compounds indicated are given as percentages by weight.

According to the present application, the global warming potential (GWP) is defined relative to carbon dioxide and relative to a duration of 100 years, according to the method given in "The scientific assessment of ozone depletion, 2002, a report of the World Meteorological Association's Global Ozone Research and Monitoring Project".

"Heat transfer compound", or "heat transfer fluid" (or refrigerant) means a compound, or a fluid, that is able to absorb heat on evaporating at low temperature and low pressure and to give up heat on condensing at high temperature and high pressure, in a vapor compression circuit. In general, a heat transfer fluid may comprise one, two, three or more than three heat transfer compounds.

"Heat transfer composition" means a composition comprising a heat transfer fluid and optionally one or more additives that are not heat transfer compounds for the application envisaged.

Embodiments of the disclosure are based on the use of a heat transfer compound, namely HFO-1234yf, and a lubricating oil, to form a heat transfer composition.

The heat transfer composition may be introduced as it is into a vapor compression circuit. Alternatively, on the one hand the heat transfer fluid (comprising HFO-1234yf), and on the other hand the lubricating oil, may be introduced separately into the circuit, at the same point or different points of the circuit. The individual heat transfer compounds may also be introduced separately, if there are several of them.

The lubricating oil comprises a polyalkylene glycol and a polyol ester.

The polyalkylene glycol in the disclosure may comprise polyalkylene glycols of different formulae, mixed together.

The polyol ester in the disclosure may comprise polyol esters of different formulae, mixed together.

In general, a polyalkylene glycol suitable for use in the context of the disclosure comprises from 5 to 50 oxyalkylene repeat units, each containing from 1 to 5 carbon atoms.

The polyalkylene glycol may be linear or branched. It may be a homopolymer or a copolymer of 2, 3 or more than 3 groups selected from the oxyethylene, oxypropylene, oxybutylene, oxypentylene groups and combinations thereof.

Preferred polyalkylene glycols comprise at least 50% of oxypropylene groups.

Preferred polyalkylene glycols are the homopolymers consisting of oxypropylene groups.

Suitable polyalkylene glycols are described in document U.S. Pat. No. 4,971,712. Other suitable polyalkylene glycols are the polyalkylene glycols having hydroxyl groups at each end, as described in document U.S. Pat. No. 4,755,316. Other suitable polyalkylene glycols are the polyalkylene glycols having a capped hydroxyl end group. The hydroxyl group may be capped with an alkyl group containing from 1 to 10 carbon atoms (and optionally containing one or more heteroatoms such as nitrogen), or a fluoroalkyl group containing heteroatoms such as nitrogen, or a fluoroalkyl group as described in document U.S. Pat. No. 4,975,212, or other similar groups.

When the two hydroxyl end groups of the polyalkylene glycol are capped, we may use the same end group or a combination of two different groups.

The terminal hydroxyl groups may also be capped by forming an ester with a carboxylic acid, as described in document U.S. Pat. No. 5,008,028. The carboxylic acid may also be fluorinated.

When the two ends of the polyalkylene glycol are capped, one or other may be capped with an ester, or else one end may be capped with an ester and the other end may be free or may be capped with the one of the aforementioned alkyl, heteroalkyl or fluoroalkyl groups.

Polyalkylene glycols usable as lubricating oils and commercially available are for example the oils Goodwrench from General Motors, MOPAR-56 from Daimler-Chrysler, Zerol from Shrieve Chemical Products, Planetelf PAG from Total and Daphne Hermetic PAG from Itemitsu. Other suitable polyalkylene glycols are manufactured by Dow Chemical and Denso.

The viscosity of the polyalkylene glycol may be for example from 1 to 1000 centistokes at 40° C., preferably from 10 to 200 centistokes at 40° C. and more especially preferably from 30 to 80 centistokes at 40° C.

The viscosity is determined according to the ISO viscosity grades, in accordance with ASTM standard D2422.

The oil marketed by Denso under the name ND8, having a viscosity of 46 centistokes, is particularly suitable.

The polyol esters are obtained by reaction of a polyol (an alcohol containing at least 2 hydroxyl groups) with a monofunctional or polyfunctional carboxylic acid or with a mixture of monofunctional carboxylic acids. The water formed during this reaction is removed to prevent a back reaction of hydrolysis.

The polyols preferred for synthesis of the polyol esters are those having a neopentyl skeleton, for example neopentyl glycol, trimethylol propane, pentaerythritol and dipentaerythritol, pentaerythritol being the polyol most often used.

The carboxylic acids that react with the polyols to form the esters may comprise from 2 to 15 carbon atoms, and the carbon backbone may be linear or branched. Among these acids, we may notably mention, nonexhaustively, n-pentanoic acid, n-hexanoic acid, n-heptanoic acid, n-octanoic acid, 2-ethylhexanoic acid, 2,2-dimethylpentanoic acid, 3,5,5-trimethylhexanoic acid, adipic acid, succinic acid, and others, as well as mixtures of two or more of these acids, in all proportions.

Certain alcohol functions are not esterified, but their proportion remains low. Thus, the polyol esters may comprise from 0 to 5 relative mol % of —$CH_2$—OH units relative to the —$CH_2$—O—(C=O)— units.

The preferred polyol esters are those having a viscosity from 1 centistoke to 1000 centistokes at 40° C., preferably from 10 centistokes to 200 centistokes, and advantageously from 30 centistokes to 80 centistokes.

As suitable polyol esters, we may mention as nonlimiting examples the oils Mobil EAL Arctic 68 and 32 (Mobil), Planetelf ACD 32 (Total) and Bitzer BSE 32 (Bitzer).

The proportion of lubricating oil that has to be used in combination with the heat transfer fluid depends on the type of installation in question. In fact, the total amount of lubricating oil in the installation mainly depends on the nature of the compressor, whereas the total amount of heat transfer fluid in the installation mainly depends on the exchangers and the pipework.

In general, the proportion of lubricating oil in the heat transfer composition, in other words relative to the sum of the lubricating oil and of the heat transfer fluid, is from 1 to 99%, preferably from 5 to 50%, for example from 10 to 40% or from 15 to 35%.

The lubricating oil used in the context of the disclosure comprises a proportion of polyol ester less than or equal to 25%.

According to certain embodiments, the lubricating oil comprises at least 1%, or at least 2%, or at least 3%, or at least 4%, or at least 5%, or at least 6%, or at least 7%, or at least 8%, or at least 9%, or at least 10%, or at least 11%, or at least 12%, or at least 13%, or at least 14%, or at least 15%, or at least 16%, or at least 17%, or at least 18%, or at least 19%, or at least 20%, or at least 21%, or at least 22%, or at least 23%, or at least 24% of polyol ester. The higher the proportion of polyol ester in the lubricating oil, the better the miscibility with the heat transfer fluid based on HFO-1234yf.

According to certain embodiments, the lubricating oil comprises at most 1%, or at most 2%, or at most 3%, or at most 4%, or at most 5%, or at most 6%, or at most 7%, or at most 8%, or at most 9%, or at most 10%, or at most 11%, or at most 12%, or at most 13%, or at most 14%, or at most 15%, or at most 16%, or at most 17%, or at most 18%, or at most 19%, or at most 20%, or at most 21%, or at most 22%, or at most 23%, or at most 24% of polyol ester. The lower the proportion of polyol ester in the lubricating oil, the better the stability of the lubricating oil.

According to a particular embodiment, the lubricating oil used consists of the mixture of polyalkylene glycol and polyol ester described above, with the exception of any other lubricating compound.

According to an alternative embodiment, another lubricating compound is used in combination with the polyalkylene glycol, in the lubricating oil. It may notably be selected from oils of mineral origin, silicone oils, paraffins of natural origin, naphthenes, synthetic paraffins, alkylbenzenes, poly-alpha-olefins, polyvinyl ethers. The polyvinyl ethers are preferred. When another lubricating compound is used in combination with the polyalkylene glycol, it is desirable for the miscibility of HFO-1234yf with this lubricating compound to be greater than the miscibility of HFO-1234yf with the polyalkylene glycol. This is the case notably for at least some of the compounds of the polyvinyl ether type.

The heat transfer compound mainly used in the context of the disclosure is HFO-1234yf.

However, the heat transfer compositions according to the disclosure may optionally comprise one or more additional heat transfer compounds, besides HFO-1234yf. These additional heat transfer compounds may notably be selected from hydrocarbons, hydrofluorocarbons, ethers, hydrofluoroethers and fluoroolefins.

According to particular embodiments, the heat transfer fluids according to the disclosure may be binary compositions (consisting of two heat transfer compounds) or ternary compositions (consisting of three heat transfer compounds) or quaternary compositions (consisting of four heat transfer compounds), in combination with the lubricating oil to form the heat transfer compositions according to the disclosure.

It is preferred, however, for the heat transfer fluid present in the heat transfer composition according to the disclosure to consist essentially of, or even consist of, HFO-1234yf. Alternatively, the proportion of HFO-1234yf in the heat transfer fluid (i.e. relative to the sum of the heat transfer compounds) is preferably greater than or equal to 30%, or 40%, or 50%, or 60%, or 70%, or 80%, or 90%, or 95%.

The other additives that may be used in the context of the disclosure may notably be selected from stabilizers, surfactants, tracing agents, fluorescent agents, odoriferous agents and solubilizers.

The stabilizer or stabilizers, when they are present, preferably represent at most 5 wt % in the heat transfer composition. Among the stabilizers, we may notably mention nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methyl phenol, 3-(3,5-di-tert-butyl-4-hydroxyphenyl)propionic acid, epoxides (alkyl optionally fluorinated or perfluorinated or alkenyl or aromatic) such as n-butylglycidyl ether, hexanedioldiglycidyl ether, allylglycidyl ether, butylphenylglycidyl ether, phosphites, phosphates such as tricresyl phosphates, thiols and lactones.

As tracing agents (that are detectable), we may mention deuterated or non-deuterated hydrofluorocarbons, deuterated hydrocarbons, perfluorocarbides, fluoroethers, brominated compounds, iodinated compounds, alcohols, aldehydes, ketones, nitrous oxide and combinations thereof. The tracing agent is different from the heat transfer compound or compounds making up the heat transfer fluid.

As solubilizers, we may mention hydrocarbons, dimethyl ether, polyoxyalkylene ethers, amides, ketones, nitriles, chlorocarbides, esters, lactones, aryl ethers, fluoroethers and 1,1,1-trifluoroalkanes. The solubilizer is different from the heat transfer compound or compounds making up the heat transfer fluid.

As fluorescent agents, we may mention naphthalimides, perylenes, coumarins, anthracenes, phenanthracenes, xanthenes, thioxanthenes, naphthoxanthenes, fluoresceins and derivatives and combinations thereof.

As odoriferous agents, we may mention alkyl acrylates, allyl acrylates, acrylic acids, acrylic esters, alkyl ethers, alkyl esters, alkynes, aldehydes, thiols, thioethers, disulfides, allylisothiocyanates, alkanoic acids, amines, norbornenes, derivatives of norbornenes, cyclohexene, heterocyclic aromatic compounds, ascaridole, o-methoxy(methyl)phenol and combinations thereof.

The method of heat transfer according to the disclosure is based on the use of an installation comprising a vapor compression circuit that contains a heat transfer composition (i.e. a heat transfer fluid and at least one lubricating oil). The method of heat transfer may be a method for heating or cooling a fluid or a body.

The vapor compression circuit comprises at least one evaporator, a compressor, a condenser and a pressure reducing valve, as well as lines for transporting fluid between these elements. The evaporator and the condenser comprise a heat exchanger allowing heat exchange between the heat transfer fluid and another fluid or body.

As compressor, we may notably use a single-stage or multistage centrifugal compressor or a mini-centrifugal compressor. Rotary compressors, of the piston or screw type, may also be used. The compressor may be driven by an electric motor or by a gas turbine (for example supplied with the exhaust gases of a vehicle, for mobile applications) or by gearing.

The installation may comprise a turbine for generating electricity (Rankine cycle).

The installation may also optionally comprise at least one circuit of heat-transfer fluid used for transferring heat (with or without change of state) between the heat transfer fluid circuit and the fluid or body to be heated or cooled.

The installation may also optionally comprise two vapor compression circuits (or more), containing identical or different heat transfer fluids. For example, the vapor compression circuits may be coupled together.

The vapor compression circuit functions according to a conventional vapor compression cycle. The cycle comprises change of state of the heat transfer fluid from a liquid phase (or liquid/vapor two-phase system) to a vapor phase at a relatively low pressure, then compression of the fluid in the vapor phase to a relatively high pressure, change of state (condensation) of the heat transfer fluid from the vapor phase to the liquid phase at a relatively high pressure, and reduction of the pressure to begin the cycle again.

In the case of a cooling process, heat obtained from the fluid or the body that is being cooled (directly or indirectly, via a heat-transfer fluid) is absorbed by the heat transfer fluid, during evaporation of the latter, at a relatively low temperature compared to the environment. The cooling processes comprise air conditioning processes (with mobile installations, for example in vehicles, or stationary installations), refrigeration and freezing or cryogenics.

In the case of a heating process, heat is given up (directly or indirectly, via a heat-transfer fluid) from the heat transfer fluid, during condensation of the latter, to the fluid or the body that is being heated, at a relatively high temperature compared to the environment. The installation for applying heat transfer is in this case called a "heat pump".

It is possible to use any type of heat exchanger for employing the heat transfer fluids according to the disclosure, and notably co-current heat exchangers or, preferably, countercurrent heat exchangers. It is also possible to use microchannel exchangers.

Embodiments of the disclosure are particularly suitable for the application of air conditioning processes in mobile or stationary installations, and more particularly automotive air conditioning.

Preferably, and notably in the context of automotive air conditioning processes, the inlet temperature of the heat transfer fluid at the evaporator is from $-10°$ C. to $20°$ C., notably from $-0°$ C. to $10°$ C., more especially preferably about $5°$ C.

Preferably, and notably in the context of automotive air conditioning processes, the temperature of the start of condensation of the heat transfer fluid at the condenser is from 25° C. to 60° C., notably from 30° C. to 50° C., more especially preferably from 35° C. to 45° C., and for example about 40° C.

It should be noted that addition of a polyol ester to a heat transfer composition comprising (or consisting of) HFO-1234yf as heat transfer fluid, as well as a lubricating oil comprising (or consisting of) polyalkylene glycol, improves the miscibility of the heat transfer fluid with the lubricating oil, i.e. increases the temperature threshold of appearance of the immiscibility zone (defined as the temperature starting from which the compounds in liquid phase form an emulsion). This makes it possible to increase the possibilities for using the heat transfer fluid, for example making it possible to use it at a higher condensation temperature.

More generally, embodiments of the disclosure make it possible to undertake replacement of any heat transfer fluid in all heat transfer applications, and for example in automotive air conditioning. For example, the heat transfer fluids and heat transfer compositions according to the disclosure may serve for replacing:

1,1,1,2-tetrafluoroethane (R134a);
1,1-difluoroethane (R152a);
1,1,1,3,3-pentafluoropropane (R245fa);
mixtures of pentafluoroethane (R125), of 1,1,1,2-tetrafluoroethane (R134a) and of isobutane (R600a), namely the R422s;
chlorodifluoromethane (R22);
the mixture of 51.2% of chloropentafluoroethane (R115) and of 48.8% of chlorodifluoromethane (R22), namely R502;
any hydrocarbon;
the mixture of 20% of difluoromethane (R32), 40% of pentafluoroethane (R125) and 40% of 1,1,1,2-tetrafluoroethane (R134a), namely R407A;
the mixture of 23% of difluoromethane (R32), 25% of pentafluoroethane (R125) and 52% of 1,1,1,2-tetrafluoroethane (R134a), namely R407C;
the mixture of 30% of difluoromethane (R32), 30% of pentafluoroethane (R125) and 40% of 1,1,1,2-tetrafluoroethane (R134a), namely R407F;
R1234ze (1,3,3,3-tetrafluoropropene).

EXAMPLES

The following examples illustrate but do not limit the disclosure.

Example 1—Miscibility of HFO-1234yf with Lubricating Oil

The miscibility of HFO-1234yf with a lubricating oil based on polyalkylene glycol and/or polyol ester is investigated in this example.

The polyalkylene glycol is the oil PAG ND8 supplied by Nippon Denso.

The polyol ester is the oil POE Ze-GLES RB68 supplied by Nippon Oil.

The procedure is as follows:
put the lubricating oil in a 16.4-ml glass tube (sealable tube) weighing the amount put in exactly;
add the desired amount of refrigerant (heat transfer compound);
seal the tube by welding it;
completely immerse the tube in a thermostatically controlled bath filled with water at room temperature. The tank used is made of Plexiglas, which makes it possible to visualize the fluid/oil mixture. The tubes are arranged vertically in tube holders;
close the tank at the top with metal plates for protection in case of breakage of a tube;
heat the water gradually and observe the temperature starting from which the mixture becomes two-phase. The maximum temperature, so as not to reach excessively high pressures, is 80° C. The temperature is first increased in steps of 5° C. with a plateau of 10 minutes each time, and when the temperature at which the mixture becomes immiscible is reached, the temperature is altered with changes of 1° C.

Production of an emulsion indicates immiscibility of the mixture.

FIG. 1 illustrates the surprising improvement in miscibility of the polyalkylene glycol with HFO-1234yf that is obtained by adding polyol ester, the actual maximum temperature of miscibility (curve) being above the theoretical maximum temperature of miscibility (straight line) extrapolated as a function of the maximum temperature of miscibility of the pure polyalkylene glycol and of the pure polyol ester. This FIGURE was obtained with HFO-1234yf/lubricating oil mixtures containing 25% of lubricating oil. The immiscibility zone corresponds to the domain located above the curve, and the zone of miscibility corresponds to the domain situated beneath the curve.

Adding from 15 to 25% of polyol ester for example makes it possible to extend the zone of miscibility by about 7 to 8 degrees relative to the expected value.

Example 2—Thermal Stability of the Lubricating Oil

The thermal stability of the lubricating oils used in example 1 is investigated in this example.

The tests are carried out according to standard ASHRAE 97-2007.

The test conditions are as follows:
mass of lubricant: 5 g;
temperature: 200° C.;
duration: 14 days.

The tests were carried out by adding 5000 ppm of water to the lubricating oil, which is considered to be a relatively high water content.

The lubricating oil is put in a 16.4-mL glass tube. The tube is then drawn out under vacuum and then welded to seal it, and placed in a stove at 200° C. for 14 days.

At the end of the test, the oils are analyzed:
with respect to their color, by spectrocolorimetry (for a slight coloration the results are given in Hazen, up to 700 and for a strong coloration the results are given in Gardner, from 3 to 15);
with respect to water content (measurement by Karl Fischer coulometry);
with respect to the acid number (Total Acid Number or TAN, titration with methanolic KOH at 0.01 N).

The results are summarized in the following table:

| Oil | 100% PAG | 15% POE 85% PAG | 35% POE 65% PAG | 55% POE 45% PAG | 80% POE 20% PAG | 100% POE |
|---|---|---|---|---|---|---|
| Color | 5.2 Gardner | 4.2 Gardner | 325 Hazen | 320 Hazen | 330 Hazen | 110 Hazen |

-continued

| Oil | 100% PAG | 15% POE 85% PAG | 35% POE 65% PAG | 55% POE 45% PAG | 80% POE 20% PAG | 100% POE |
|---|---|---|---|---|---|---|
| Water content (ppm) | 5300 | 4900 | 4300 | 4900 | 4500 | 5000 |
| Acid number (mg KOH/g) | 4.7 | 8.8 | 16.2 | 14.8 | 13.1 | 12.3 |

It can be seen that in order to maintain satisfactory thermal stability, the content of polyol ester in the oil must be kept less than or equal to about 25%, notably less than or equal to about 20%, and ideally less than or equal to 15%.

The invention claimed is:

1. A composition comprising 2,3,3,3-tetrafluoropropene and from 5 to 40 wt. % of a lubricating oil, the lubricating oil comprising a polyalkylene glycol and a polyol ester, the content of polyol ester in the lubricating oil being less than or equal to 25%.

2. The composition as claimed in claim 1 comprising from 10 to 40 wt. % of the lubricating oil, and wherein the lubricating oil comprises from 5 to 25 wt. % of polyol ester and from 75 to 95 wt. % of polyalkylene glycol.

3. The composition as claimed in claim 1, wherein the lubricating oil comprises from 7 to 20 wt. % of polyol ester and from 80 to 93 wt. % of polyalkylene glycol.

4. The composition as claimed in claim 1, wherein the lubricating oil comprises from 10 to 15 wt. % of polyol ester and from 85 to 90 wt. % of polyalkylene glycol.

* * * * *